(12) United States Patent
Sawada et al.

(10) Patent No.: US 8,499,234 B2
(45) Date of Patent: Jul. 30, 2013

(54) SYSTEM FOR COMMUNICATION THROUGH SPATIAL BULLETIN BOARD

(75) Inventors: Mamoru Sawada, Tokyo (JP); Takuro Komine, Tokyo (JP); Eiichi Hakkaku, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1099 days.

(21) Appl. No.: 11/901,086

(22) Filed: Sep. 14, 2007

(65) Prior Publication Data

US 2008/0235570 A1 Sep. 25, 2008

(30) Foreign Application Priority Data

Sep. 15, 2006 (JP) ................................. 2006-251738

(51) Int. Cl.
*G06F 17/24* (2006.01)
*G01C 3/00* (2006.01)
(52) U.S. Cl.
USPC ............................... 715/230; 715/232; 356/3
(58) Field of Classification Search
USPC .......................................... 715/230, 232, 233
See application file for complete search history.

(56) References Cited

U.S. PATENT DOCUMENTS

| | | | | |
|---|---|---|---|---|
| 5,764,797 | A * | 6/1998 | Adcock ........................... | 382/187 |
| 6,633,304 | B2 * | 10/2003 | Anabuki et al. ................ | 345/633 |
| 6,879,835 | B2 * | 4/2005 | Greene et al. .............. | 455/456.1 |
| 2002/0049644 | A1 | 4/2002 | Kargman | |
| 2002/0120564 | A1 | 8/2002 | Strietzel | |
| 2003/0104820 | A1 * | 6/2003 | Greene et al. .................. | 455/456 |
| 2004/0030756 | A1 | 2/2004 | Matsuyama et al. | |
| 2006/0007311 | A1 * | 1/2006 | Watanabe ....................... | 348/158 |
| 2006/0136813 | A1 * | 6/2006 | Hong et al. ..................... | 715/512 |
| 2006/0159344 | A1 * | 7/2006 | Shao et al. ..................... | 382/186 |

FOREIGN PATENT DOCUMENTS

| | | |
|---|---|---|
| CN | 1452751 A | 10/2003 |
| EP | 1316897 A1 | 6/2003 |
| JP | 08-114439 | 5/1996 |
| JP | 08-184436 | 7/1996 |
| JP | 2004-64763 | 2/2004 |
| JP | 2004288188 A | 10/2004 |
| JP | 2004-317715 | 11/2004 |
| JP | 2005-173042 | 6/2005 |
| JP | 2006059136 A | 3/2006 |
| JP | 2006154902 A | 6/2006 |
| JP | 2006-178804 | 7/2006 |

OTHER PUBLICATIONS

Herecast: an open infrastructure for location based services using WiFi, by Mark Paciga (2005).*
The Mobile Phone as a Digital SprayCan by Philip Garner et al (Presented Jun. 14-15, 2006 at ACE).*
First Notification of Office Action dated Mar. 11, 2010.

(Continued)

*Primary Examiner* — William Bashore
*Assistant Examiner* — Nathan Shrewsbury
(74) *Attorney, Agent, or Firm* — MKG, LLC

(57) ABSTRACT

A spatial bulletin board system for virtually writing a memo in an actual space and displaying the memo superimposed on a picked-up image of the actual space. The system includes an input device that converts drawing movement during the creation of content in an actual space to three-dimensional coordinate information and acquires positional information which specifies a place in which the memo is written and saves the information in a spatial communication server. In the image-pickup place, the picked-up image is displayed on a spatial bulletin board display device and a browsing request is sent to the spatial communication server.

6 Claims, 11 Drawing Sheets

OTHER PUBLICATIONS

Japanese Office Action for corresponding Japanese Patent Application No. 2006-251738.

European Search Report, Application No. EP 07116423.0, Dated Jan. 17, 2008.

* cited by examiner

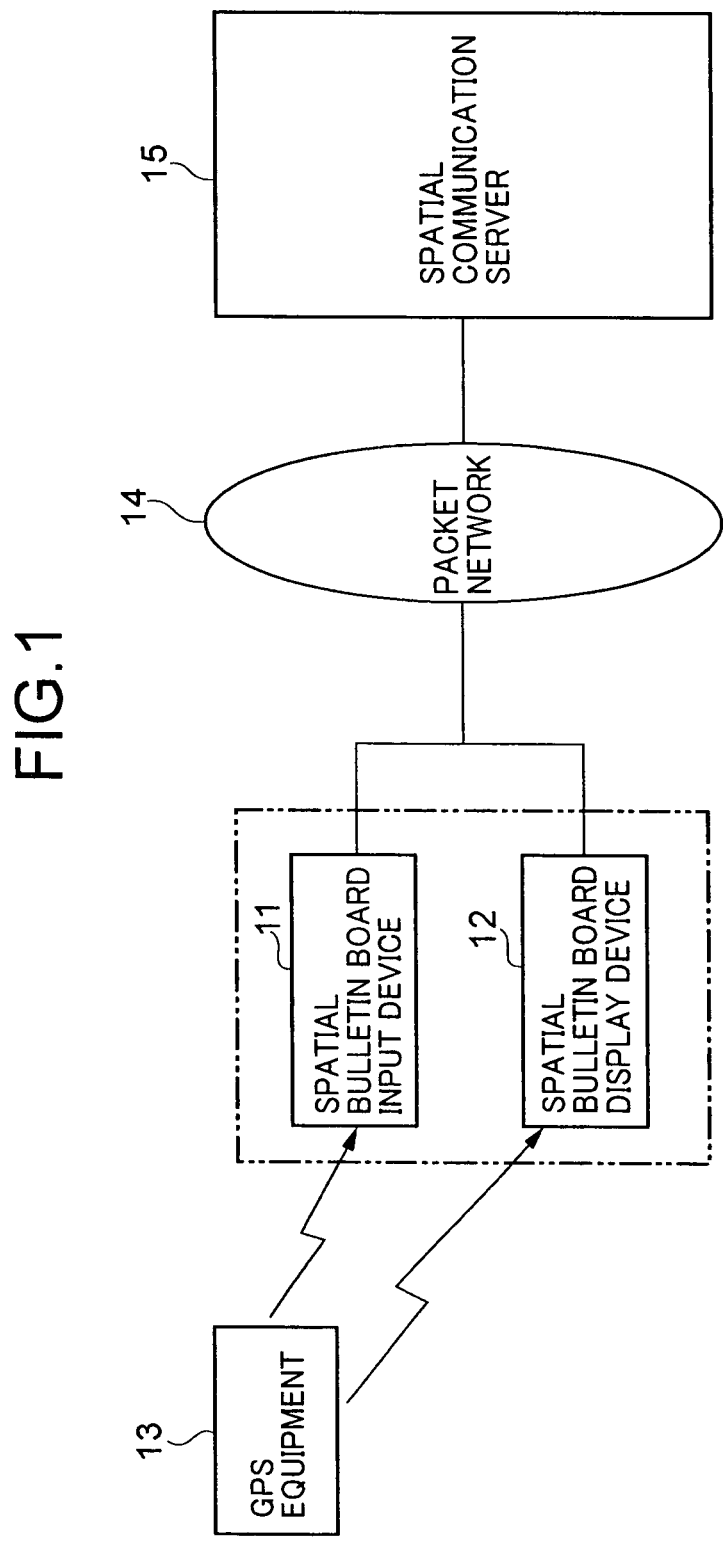

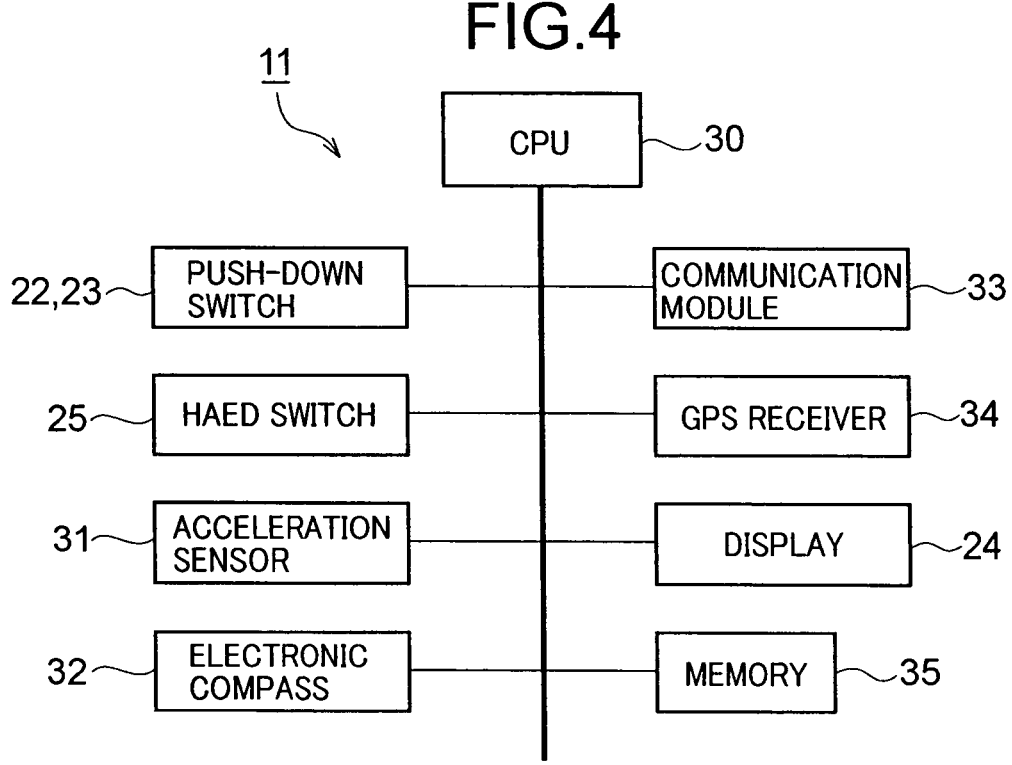
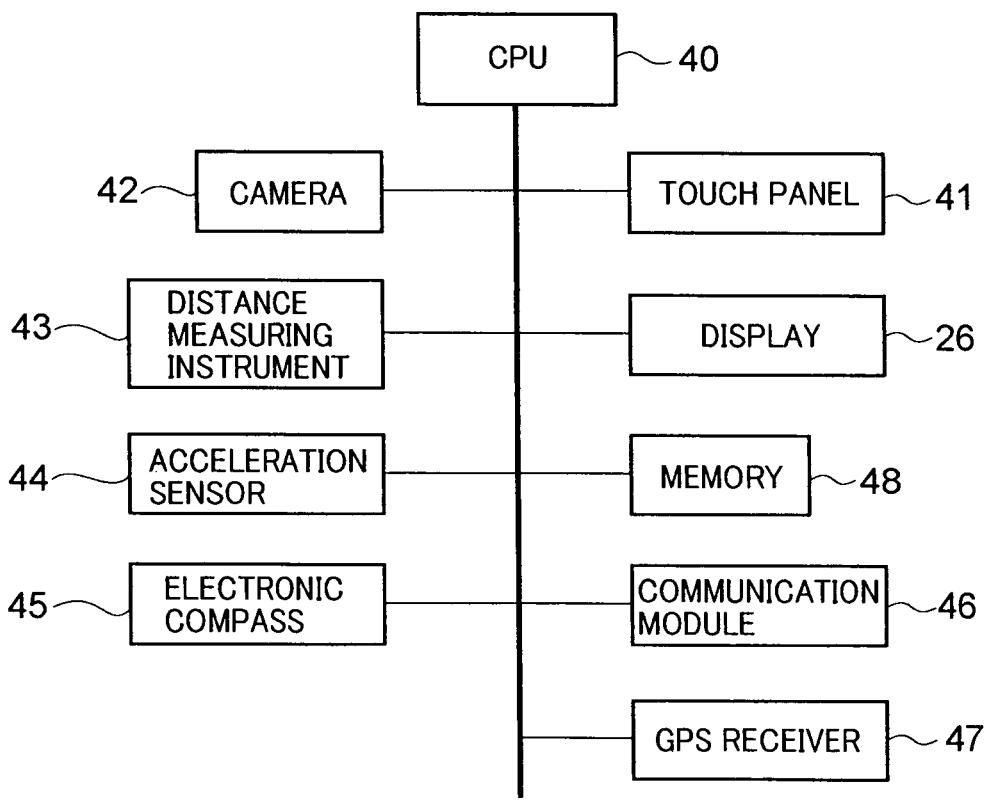

FIG.7

| POSITIONAL INFORMATION | CLASSIFICATION/ GROUP | OBJECT DATA |
|---|---|---|
| (LATITUDE, LONGITUDE, ALTITUDE) ① | PUBLIC | OBJECT 1 |
| (LATITUDE, LONGITUDE, ALTITUDE) ② | PUBLIC | OBJECT 2 |
| (LATITUDE, LONGITUDE, ALTITUDE) ③ | GROUP 1 | OBJECT 3 |
| (LATITUDE, LONGITUDE, ALTITUDE) ④ | GROUP 2 | OBJECT 4 |
| (LATITUDE, LONGITUDE, ALTITUDE) ⑤ | GROUP 1 | OBJECT 5 |
| (LATITUDE, LONGITUDE, ALTITUDE) ⑥ | PUBLIC | OBJECT 6 |
| (LATITUDE, LONGITUDE, ALTITUDE) ⑦ | GROUP 3 | OBJECT 7 |
| (LATITUDE, LONGITUDE, ALTITUDE) ⑧ | PUBLIC | OBJECT 8 |
| (LATITUDE, LONGITUDE, ALTITUDE) ⑨ | GROUP 2 | OBJECT 9 |
| (LATITUDE, LONGITUDE, ALTITUDE) ⑩ | GROUP 1 | OBJECT 10 |

SYSTEM FOR COMMUNICATION THROUGH SPATIAL BULLETIN BOARD

CROSS-REFERENCE TO RELATED APPLICATION

The present disclosure relates to subject matter contained in Japanese Patent Application No. 2006-251739 filed on Sep. 15, 2006, which are expressly incorporated herein by reference in its entirety.

BACKGROUND OF THE INVENTION

1. Field of the Invention

The present invention relates to a spatial bulletin board system for virtually writing a memo in an actual space and displaying the memo superimposed on a picked-up image in the actual space.

2. Description of the Prior Art

In the present information-oriented society in which IT technologies have developed to a high degree and ubiquitous computing has been widely developed, communications using various techniques are made possible between users and stores or between users. Examples of techniques for one-way communication from a store to users include television advertisement or Internet advertisement. A communication technique combining an actual space and an advertisement has also been also proposed. To guide the user to the store, this communication technique displays an advertisement broadcast from a broadcasting station on a display surface of a head-mounted display (HMD) fitted by the user in correspondence with the actual space. More specifically, the technique is configured to receive advertisement contents and positional information of the advertisement in the actual space using the HMD, detect the position and attitude of the display surface on which to display the advertisement, determine the display position of the advertisement on the display surface based on the position and attitude and the received positional information, and display the received advertisement contents at the display position.

On the other hand, examples of the technique for communication among users include calls using a cellular phone, video image communication using a cellular phone with a camera, e-mail or the like. Communication using an information communication terminal such as a cellular phone (calls, data communication) has become the simplest communication technique at present.

However, since the above-described is the configuration in which an advertisement (including advertisement contents and positional information) produced by a sponsor side is broadcast from a broadcasting station, it lacks flexibility as the communication technique. Furthermore, when applied to a communication between users, it is not realistic for an individual user who does not have knowledge or facilities to create a message (including a memo, image, other information) which is equivalent to an advertisement and have it registered in the broadcasting station. There is a demand for a communication technique that enables messages to be exchanged using an actual space using a simpler method.

SUMMARY OF THE INVENTION

It is an object of the present invention to provide a spatial bulletin board system that allows messages to be easily exchanged and communication to be carried out between users or between a user and a store using an actual space.

An aspect of the present invention includes a spatial bulletin board input device that converts drawing movement during the creation of content in an actual space to three-dimensional coordinate information, the spatial bulletin board input device takes in the information and acquires positional information. This positional information specifies a place in which the memo is written. A spatial communication server takes in and saves the three-dimensional coordinate information of the memo content and memo positional information on the place in which the memo is written from the spatial bulletin board input device via a communication network, and a spatial bulletin board display device, that receives at an image-pickup place in an actual space, the three-dimensional coordinate information of the memo content and the memo positional information near the image-pickup place from the space communication server and displays the memo content on the picked-up image in the actual space based on the three-dimensional coordinate information and the memo positional information.

According to this configuration, if the memo is virtually written in the actual space of a certain place using the spatial bulletin board input device, the written memo content is converted to three-dimensional coordinate information and taken in, and positional information identifying the place in which the memo is written is acquired, and three-dimensional coordinate information indicating the memo content and the memo positional information indicating the place in which the memo is written are saved in the spatial communication server via the communication network. On the other hand, in the same place, the spatial bulletin board display device receives the memo content included in the image-pickup range from the spatial communication server together with the memo positional information and displays the memo content together with the picked-up image in the actual space, and it is thereby possible for a certain user to virtually write down a memo in the actual space and for another user to confirm the written memo content when the user sees the same actual space through the picked-up image of the spatial bulletin board display device and in this way realize communication through the space.

The above described spatial communication server saves a group number of a group in which the memo content can be browsed associated with the three-dimensional coordinate information of the memo content and delivers, when a browsing request which specifies the group number is received from the spatial bulletin board display device, the three-dimensional coordinate information and the memo positional information of the memo content which corresponds to the group number in question. When a browsing request which specifies the group number is received from the spatial bulletin board display device, the memo content and the memo positional information which corresponds to the group number in question are delivered and it is thereby possible to provide a closed spatial bulletin board in a group which cannot be browsed from other groups.

The above described spatial bulletin board display device can be configured with a camera that picks up an image of an actual space in an image-pickup place, a display that displays the picked-up image captured by the camera in real time, position acquisition means for acquiring a camera position which is the image-pickup place by communicating with position detection equipment, and communication section that communicates with a spatial communication server via a network. The above described spatial bulletin board display device sends browsing positional information indicating a predetermined position around the image-pickup place to the spatial communication server, receives the three-dimensional coordinate information and the memo positional information of the memo content searched at the spatial communication server based on the browsing positional information from the spatial communication server and displays the memo content at a predetermined position of the picked-up image based on the three-dimensional coordinate information and the memo positional information of the received memo content.

The above described spatial bulletin board display device is configured so as to include an electronic compass that detects an azimuth and distance measuring section that measures a distance to an object whose image has been picked up by the camera and send, when a first display mode in which the memo content is displayed centered on the object is selected, the object position calculated from the measured value of the distance to the object, camera position and azimuth detection value to the spatial communication server as browsing positional information.

According to this configuration, the object position is transmitted to the spatial communication server as the browsing positional information, and it is thereby possible to acquire the memo content within a predetermined range with the object position as the browsing center position and display the memo content written down centered on the object actually displayed in the picked-up image instead of the camera position.

The above described spatial communication server includes reception means for receiving three-dimensional coordinate information of a movement of drawing a memo content in an actual space and memo positional information indicating a place in which the memo is written, sent from a spatial bulletin board input device via a communication network, a database that saves the three-dimensional coordinate information of the received memo content in correspondence with the memo positional information as one piece of object data, search section that searches object data whose memo positional information is included in a browsing range from the above described database based on the browsing positional information transmitted from the spatial bulletin board display device in the image-pickup place in the actual space, and delivery section that delivers the searched object data together with the memo positional information to the above described spatial bulletin board display device.

BRIEF DESCRIPTION OF THE DRAWINGS

The various features of novelty which characterize the invention are pointed out with particularity in the claims attached to and forming a part of this specification. For a better understanding of the invention, its operating advantages, and specific objects attained by its use, reference should be had to the accompanying drawing and descriptive matter in which there is illustrated and described a preferred embodiment of the invention.

FIG. 1 shows the system configuration of a spatial bulletin board system according to an embodiment of the present invention;

FIG. 4 is a functional block diagram of the spatial bulletin board input device according to the above described embodiment;

FIG. 5 is a functional block diagram of the spatial bulletin board display device according to the above described embodiment;

FIG. 7 illustrates the data structure of the database in the spatial communication server;

DESCRIPTION OF THE PREFERRED EMBODIMENTS

Figure 2A:
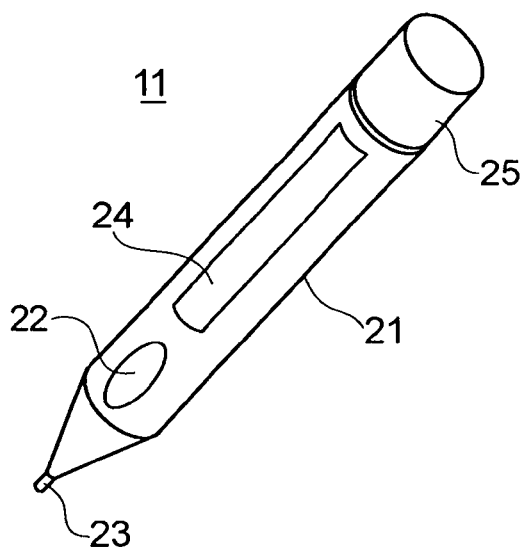
FIG. 2A shows an outside appearance of the spatial bulletin board input device according to the above described embodiment.

Hereinafter, an embodiment of the present invention will be explained in detail with reference to the attachment drawings.

FIG. 1 is the overall configuration of a spatial bulletin board system according to an embodiment of the present invention. A spatial bulletin board input device 11 is a device for a user to virtually write a message or the like to a desired object (including material, animal and plant or scenery or the like) in an arbitrary place of the actual space. A message or the like virtually written in the actual space by the spatial bulletin board input device 11 is handled as a spatial bulletin board. The spatial bulletin board input device 11 generates bulletin board positional information indicating the display position of the spatial bulletin board in the actual space and also generates three-dimensional coordinate information indicating the movement of the spatial bulletin board input device 11 which becomes a message content to be written into the spatial bulletin board.

A spatial bulletin board display device 12 is a device to display, when the user takes a picture of and displays an actual space in an arbitrary place (actual space), a spatial bulletin board which is set within the image-pickup range in correspondence with the position in the actual space.

The spatial bulletin board input device 11 and the spatial bulletin board display device 12 are configured to communicate with GPS equipment 13 respectively to be able to acquire the own positional information and also communicate with various servers on a packet network 14 via the packet network 14. A cellular phone packet network administered by a communication provider can be used as the packet network 14. Furthermore, a communication station installed on the ground or one or a plurality of artificial satellites which orbit on an orbit may be used as the GPS equipment 13.

The spatial communication server 15 registers the spatial bulletin board information which is sent from the spatial bulletin board input device 11 and sends spatial bulletin board information near the image-pickup place in reply to a browsing request from the spatial bulletin board display device 12.

As described above, the spatial bulletin board system according to this embodiment is designed such that a user (A) virtually writes a message to a desired object in the actual space using the spatial bulletin board input device 11 and another user (B) goes to the same place and displays the message or the like written by the user (A) to the object on a picked-up image in the actual space using the spatial bulletin board display device 12 as a spatial bulletin board.

Figure 2B:
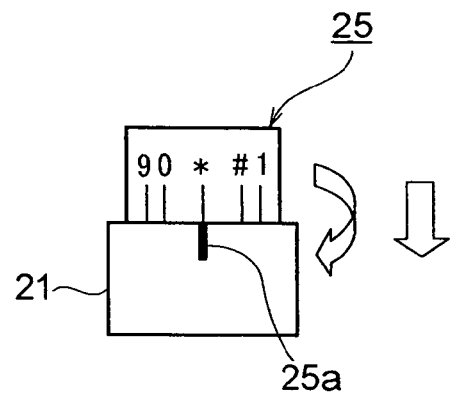
FIG. 2B is a side view of a head switch of the spatial bulletin board input device.
Figure 3:
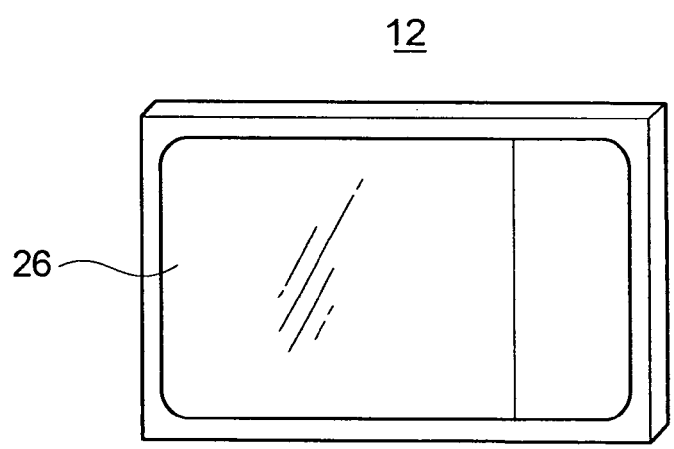
FIG. 3 shows an outside appearance of the spatial bulletin board display device according to the above described embodiment.

FIG. 2A, 2B show an outside appearance of the spatial bulletin board input device 11 and FIG. 3 shows an outside appearance of the spatial bulletin board display device 12. The spatial bulletin board input device 11 shown in of FIG. 2A is a pen-type dedicated input device. Push-down switches 22, 23 are provided at the tip of a pen body 21 and the pen point. A liquid crystal display 24 is provided in the longitudinal direction of the pen body 21 and a head switch 25 which also serves as a rotary number inputting mechanism is provided at the pen head. As shown in FIG. 2B, the head switch 25 is turned so that an input character is aligned with a reference line 25*a*, the head switch 25 is then knocked to confirm the input character and in this way the input character is displayed on the liquid crystal display 24 in a left-justified manner. For example, a group number and a password are input using the number inputting mechanism. Furthermore, the spatial bulletin board display device 12 shown in FIG. 3 is a card-type viewer dedicated device. A touch panel type liquid crystal display 26 is provided on one side and an image-pickup camera (not shown) is provided on the other side.

FIG. 4 is a functional block diagram of the spatial bulletin board input device 11. The spatial bulletin board input device 11 is provided with a CPU 30 and acquires positional information on the spatial bulletin board and message content (three-dimensional coordinate information) based on input signals from the push-down switches 22, 23, the head switch 25 which also serves as the number inputting mechanism, an acceleration sensor 31 that detects acceleration in two axial or three axis directions, an electronic compass 32 that detects an azimuth and a GPS receiver 34 that acquires current positional information. Furthermore, the spatial bulletin board input device 11 is provided with a communication module 33 for carrying out data communication via the packet network 14 and a memory 35 that temporarily stores positional information and message content (three-dimensional coordinate information).

FIG. 5 is a functional block diagram of the spatial bulletin board display device 12. The spatial bulletin board display device 12 is provided with a CPU 40 which executes processing for displaying a spatial bulletin board on a picked-up image in the actual space. A touch panel 41 is provided on the front of the liquid crystal display 26. Furthermore, the spatial bulletin board display device 12 is provided with a camera 42 that picks up an image of the actual space and a distance measuring instrument 43 that measures the distance to an object included in the picked-up image and displays the picked-up image on the liquid crystal display 26. Furthermore, the spatial bulletin board display device 12 is also provided with an acceleration sensor 44 that detects acceleration in two axial or three axis directions, an electronic compass 45 that detects an azimuth, a communication module 46 for carrying out data communication via the packet network 14, a GPS receiver 47 that acquires current positional information, and a memory 48 that stores the spatial bulletin board information received from the spatial communication server 15. The CPU 40 displays an input screen on the liquid crystal display 26 and detects a touch position on the input screen using the touch panel 41 and judges various instruction input contents from the user.

Figure 6:
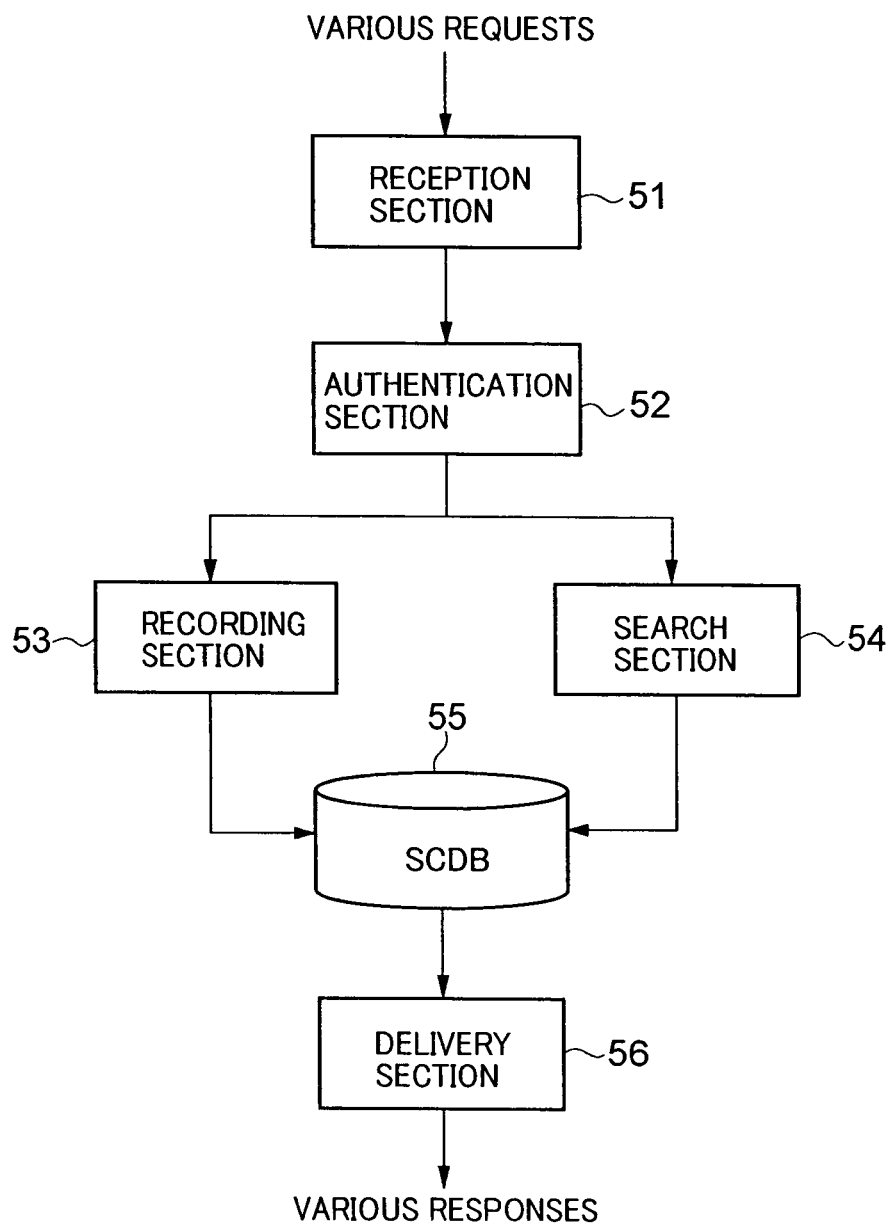
FIG. 6 is a conceptual diagram of the spatial communication server according to the above described embodiment.

FIG. 6 is a conceptual diagram of the spatial communication server 15. The spatial communication server 15 receives various requests sent from the spatial bulletin board input device 11 and the spatial bulletin board display device 12 at a reception section 51 and performs authentication at an authentication section 52. A recording section 53 stores the spatial bulletin board information received from the authenticated spatial bulletin board input device 11 in a spatial communication database (hereinafter, referred to as a "SCDB") 55. Furthermore, a search section 54 searches corresponding spatial bulletin board information from the SCDB 55 based on the positional information received from the authenticated spatial bulletin board display device 12. According to this embodiment, there are two display modes in which the spatial bulletin board display device 12 displays spatial bulletin boards. A first display mode is to display all spatial bulletin boards registered within a radius of X meters centered on an object. A second display mode is to display all spatial bulletin boards registered within a distance of X meters from a display terminal (camera). Suppose a request sent from the spatial bulletin board display device 12 includes display mode information.

A delivery section 56 is the part that sends responses to various requests sent from the spatial bulletin board input device 11 and the spatial bulletin board display device 12. To a data read request received from the spatial bulletin board display device 12, the delivery section 56 sends the spatial bulletin board information searched by the search section 54 as a response.

Figure 8:
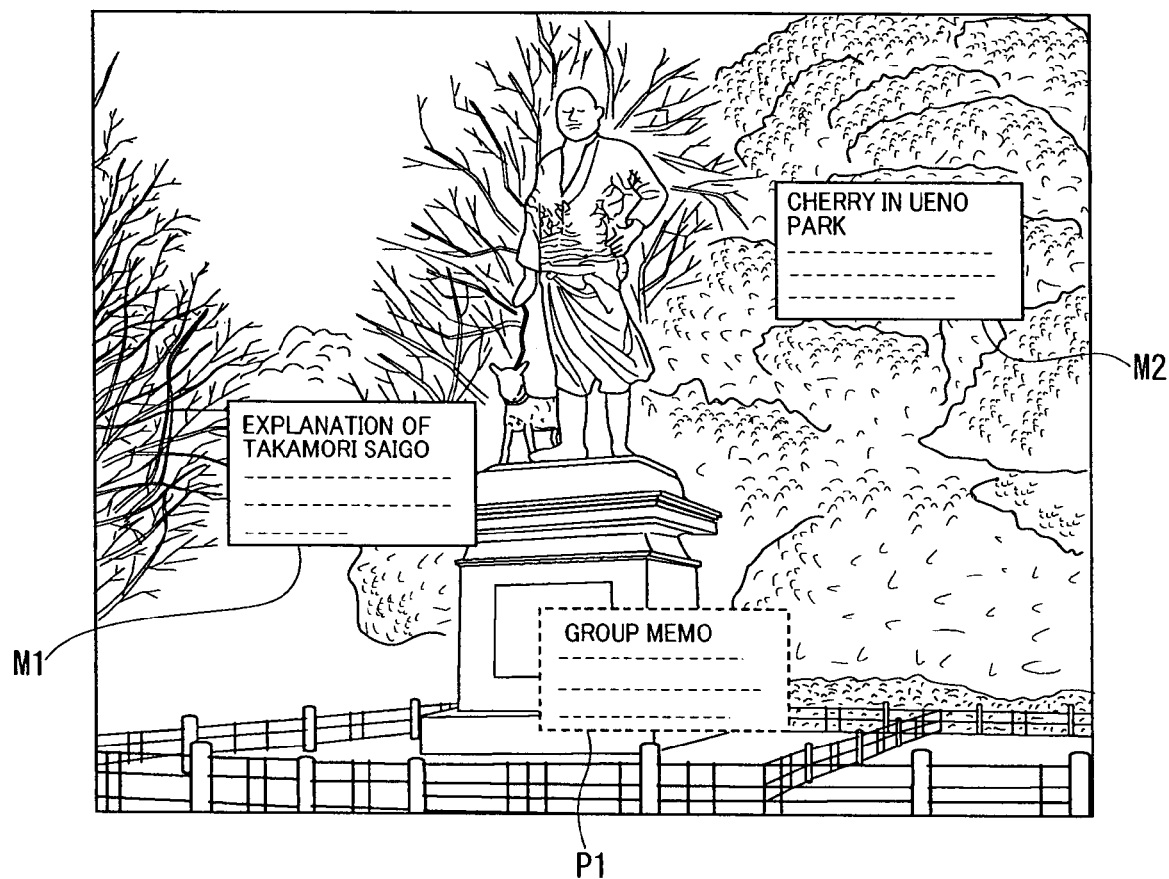
FIG. 8 shows the spatial bulletin board displayed in an actual space.

FIG. 7 is a conceptual diagram to explain the data structure of the SCDB 55 in the spatial communication server 15. FIG. 8 shows a specific example of an actual spatial image and a spatial bulletin board displayed on the spatial bulletin board display device 12. The data structure of the SCDB 55 will be explained with reference to the specific example of the actual spatial image and the spatial bulletin board shown in FIG. 8.

As shown in FIG. 8, this embodiment allows two types of spatial bulletin board; public memo (M1, M2) and group memo (P1) to be registered. The public memo refers to a spatial bulletin board to exhibit message contents to unspecified users and the group memo refers to a spatial bulletin board to exhibit message contents only to users who belong to a specific group. For example, suppose the actual space shown in FIG. 8 is the neighborhood of the statue of Takamori Saigo in the Ueno Park. For the public memo M1, the statue of Takamori Saigo itself is an object and narrative text of Takamori Saigo constitutes a memo content thereof. For the public memo M2, the cherry tree planted behind the stature is an object and narrative text of the cherry in the Ueno park constitutes a memo content thereof. For the group memo P1, the statue of Takamori Saigo is an object and this is the memo virtually written by a user of a certain group in the actual space in correspondence with the statue of Takamori Saigo in the Ueno Park and message text for users who belong to the group constitutes a memo content thereof. In this way, the spatial bulletin board information can make up the classification such as a public memo or a group memo and the memo content of the spatial bulletin board with information such as three-dimensional coordinate information (object data) and display position of the spatial bulletin board.

As shown in FIG. 7, the data structure of the SCDB 55 is composed of positional information 61 which specifies the display position of the spatial bulletin board in the actual space, classification of the spatial bulletin board and group number 62, and object data 63 which becomes a memo content of the spatial bulletin board. The data structure of the SCDB 55 shown in FIG. 7 is an example and anything other than the combination of the positional information 61 and object data 63 can be modified according to the use and the purpose as appropriate. There is a possibility that a plurality of spatial bulletin boards may be set at the same position depending on circumstances. When a plurality of spatial bulletin boards are set at the same position, the spatial bulletin boards will be displayed superimposed on each other as will be described later.

Next, the operation of the spatial bulletin board system configured as shown above will be explained.

Figure 9:
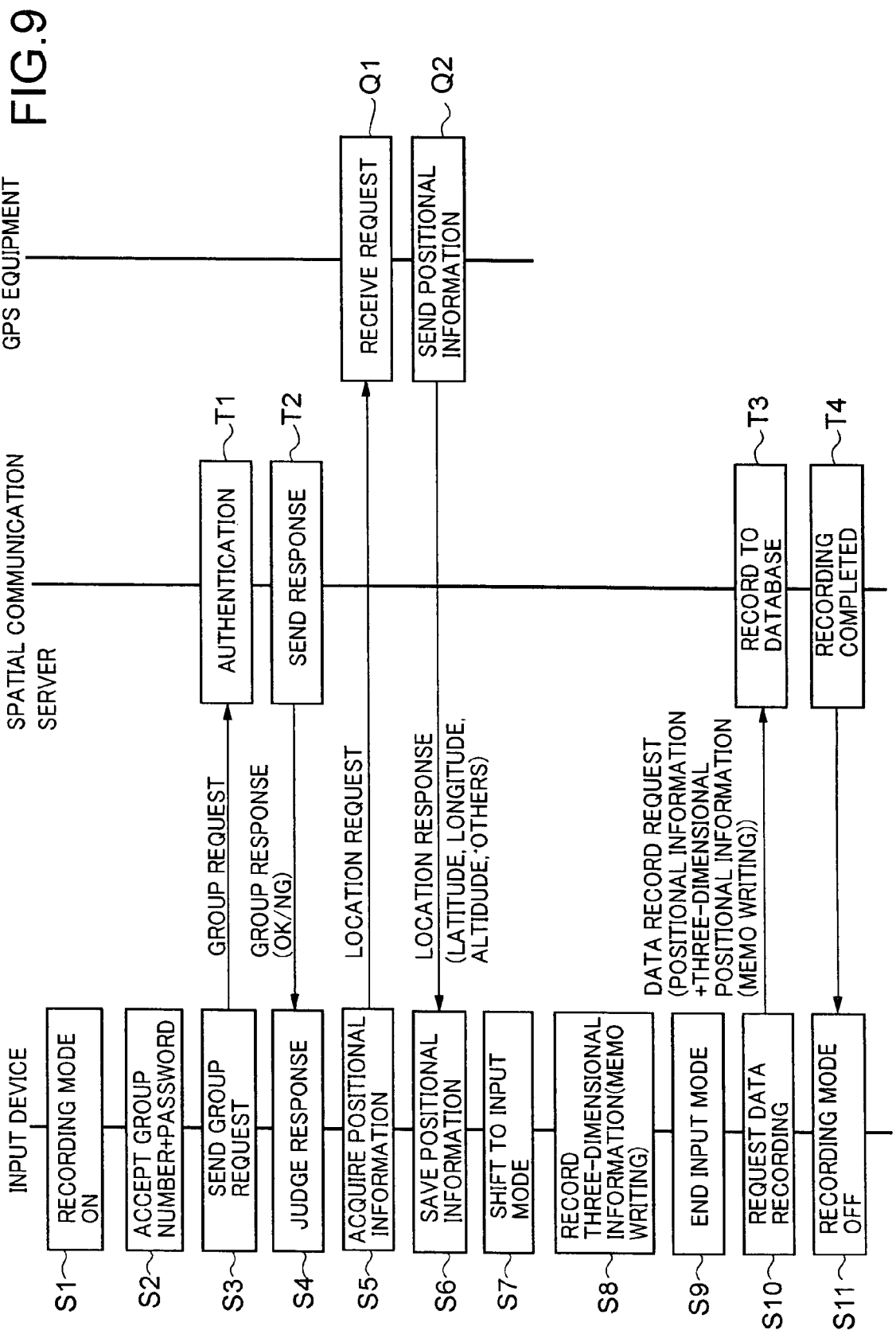
FIG. 9 is a sequence diagram of a writing sequence according to the above described embodiment.

FIG. 9 shows a memo writing sequence on a spatial bulletin board using the spatial bulletin board input device 11. Suppose a user (A) who belongs to a group 1 is standing in front of the statue of Takamori Saigo in the Ueno Park at a position several m from the statue.

When the user (A) depresses the head switch 25 of the spatial bulletin board input device 11, the writing mode turns ON in the spatial bulletin board input device 11 (step S1). When the writing mode turns ON, entries of a group number and a password are accepted (step S2). When the classification of the spatial bulletin board is a "group memo", the user inputs a group number and a password. According to this embodiment, by turning the head switch 25 which is the rotary part of the number inputting mechanism, causing the input character to be aligned with the reference line 25a and knocking the head switch 25, one character is confirmed and entered at a time. Since the input characters are displayed on the liquid crystal display 24, after confirming them, if there is no input error, the push-down switch 22 is depressed. When the push-down switch 22 is depressed, the group number and the password as a group request are transmitted from the communication module 33 in the spatial bulletin board input device 11 to the spatial communication server 15 via the packet network 14 (step S3).

When the reception section 51 receives the group request, the spatial communication server 15 hands over the password and the group number to the authentication section 52 to perform authentication (step T1). A group response "OK" when the authentication is successful or "NG" when the authentication fails is sent to the spatial bulletin board input device 11 (step T2). 100471 The spatial bulletin board input device 11 judges the content of the group response (step S4). When the group response is OK, it transmits a location request which requests the current positional information (longitude, latitude, altitude) of the spatial bulletin board input device 11 to the GPS equipment 13 (step S5).

Upon receiving the location request (step Q1), the GPS equipment 13 notifies the positional information (longitude, latitude, altitude) of the spatial bulletin board input device 11 which is requesting the location (step Q2).

In the spatial bulletin board input device 11, the GPS receiver 34 receives the positional information (longitude, latitude, altitude) from the GPS equipment 13, the positional information is stored in the memory 35 (step S6) and a message prompting an input is displayed on the display 24. As a result, this means that the positional information in the actual space in which the user (A) who holds the spatial bulletin board input device 11 is standing at present has been stored in the memory 35 of the spatial bulletin board input device 11. The positional information of the spatial bulletin board input device 11 acquired here will be used later as the positional information of the spatial bulletin board.

Next, depressing the push-down button 25 while the message prompting an input is being displayed on the display 24 of the spatial bulletin board input device 11 causes the mode to shift to an input mode (step S7). In the input mode, the user (A) writes a desired message to a virtual spatial bulletin board associated with an arbitrary object in the actual space. When the mode is shifted to the input mode, the movement (track) of the pen point of the spatial bulletin board input device 11 is recorded into the memory 35 in the format of three-dimensional coordinate data (step S8).

Figure 10:
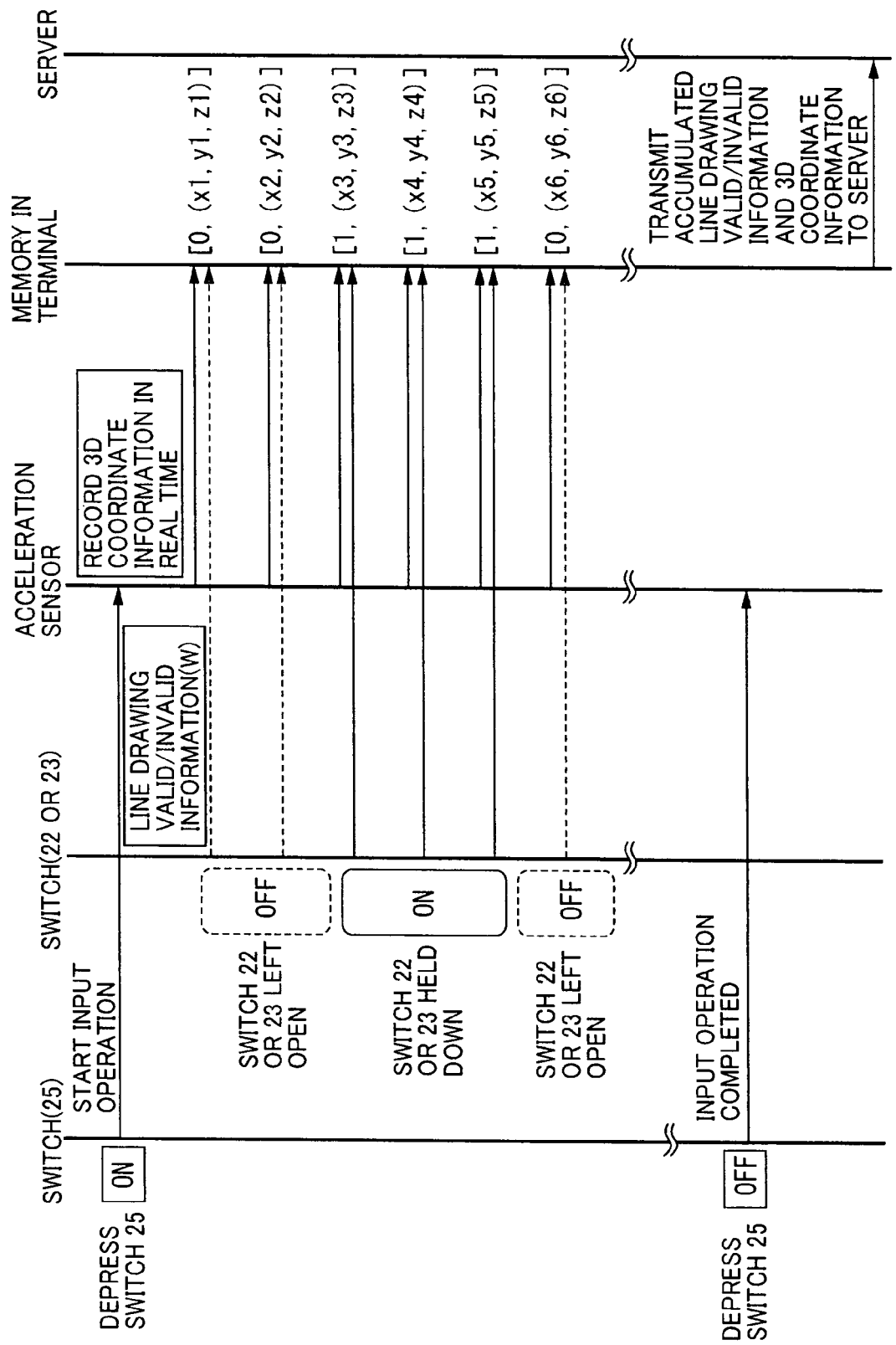
FIG. 10 is a sequence diagram in an input mode in the writing sequence.

FIG. 10 is a sequence diagram showing the details of the operation of the spatial bulletin board input device 11 in the input mode. As shown in the same figure, in the input mode, signals detecting the depressing of the push-down button 22 or 23 are sequentially taken in as line drawing valid/invalid information (W) of the pen point of the spatial bulletin board input device 11 and detection signals of three axial directions detected by the acceleration sensor 31 are sequentially taken in as three-dimensional coordinate information (X, Y, Z). The CPU 30 stores the line drawing valid/ invalid information (W) and three-dimensional coordinate information (X, Y, Z) which have been sequentially taken in the memory 35 in the data format of [W, (X,Y, Z)] on a time-series basis. In FIG. 10, it is assumed that W=1 when the line drawing is valid and W=0 when the line drawing is invalid. When the push-down button 25 of the spatial bulletin board input device 11 is depressed again, the input mode is canceled (step S9). A series of data in the [W, (X, Y, Z)] format which is a combination of the series of line drawing valid/invalid information (W) and three-dimensional coordinates (X, Y, Z) input after the mode is shifted to the input mode until the input mode is canceled and stored in the memory 35 on a time-series basis is extracted as one piece of object data.

In this way, when the user (A) draws a desired message in the space using the pen point (spatial bulletin board input device 11), the three-dimensional coordinates of the pen point then are sequentially written into the memory 35. When the three-dimensional coordinates of the pen point are reconstructed and visualized, this becomes the message itself that the user (A) has written. That is, when the user (A) writes some message as a memo in a space toward the statue of the Takamori Saigo in front of the statue of the Takamori Saigo in the Ueno park, the message content is recorded into the memory 35 together with the positional information on the place in which the user (A) is standing. The positional information recorded in the memory 35 and the three-dimensional coordinate data of the pen point in this case become spatial bulletin board information.

When the user (A) depresses the push-down switch 22 of the spatial bulletin board input device 11, a data recording request is transmitted to the spatial communication server 15 (step S10). With the data recording request, the spatial bulletin board information which consists of the three-dimensional coordinate data indicating the positional information and the message content recorded in the memory 35 is transmitted. The spatial bulletin board information can include the classification.

When the spatial communication server 15 receives the data recording request from the already authenticated spatial bulletin board input device 11, the recording section 53 newly creates a record in the spatial bulletin board in the SCDB 55 (step T3). For example, as shown in FIG. 7, the positional information (longitude, latitude, altitude) extracted from the data recording request this time is written as the item of the positional information 61, the group number confirmed at the time of the authentication is written as the item of classification/group 62 and the three-dimensional coordinate data indicating the message content together with the object number is written as the item of the object data 63. When the recording of the spatial bulletin board record ends normally, the spatial communication server 15 sends a response of recording completed to the spatial bulletin board input device 11 (step T4).

The spatial bulletin board input device 11 receives the response of the recording completed from the spatial communication server 15 and turns OFF the writing mode (step S11).

Through the above described series of processes, it is considered that the spatial bulletin board information has been registered in the spatial communication server 15.

Next, the operation that another user (B) browses the message content written by the user (A) in the spatial bulletin board will be explained.

Figure 11:
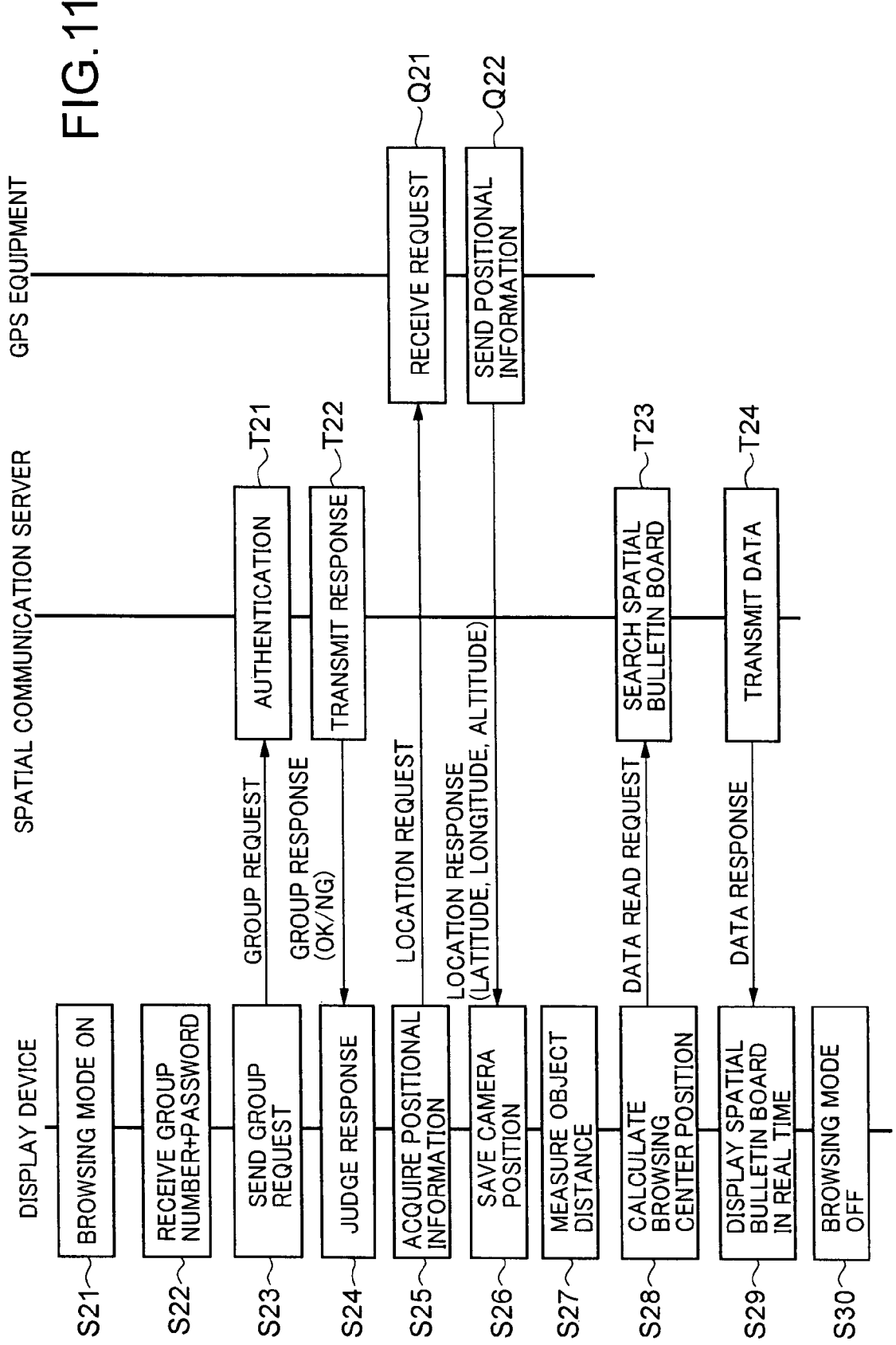
FIG. 11 is a sequence diagram of a browsing sequence according to the above described embodiment.

FIG. 11 shows a browsing sequence when the user (B) browses a message content already written in the spatial bulletin board by a stranger using the spatial bulletin board display device 12. Suppose the user (B) who belongs to the same group as that of the user (A) is standing around the statue of Takamori Saigo in the Ueno Park which is the same place that the user (A) wrote the memo into the spatial bulletin board as described above.

The browsing mode is turned ON by operating the spatial bulletin board display device 12 which is a card-type dedicated viewer (step S21). For example, when the browsing mode button displayed on the liquid crystal display 26 is depressed, the CPU40 judges that the browsing mode is ON. When the browsing mode is ON, a screen that prompts to input a group number and a password of the user (B) is displayed (step S22). When the user (B) inputs the group number and the password to the input requesting screen, a group request is transmitted from the communication module 46 to the spatial communication server 15 (step S23). The group number and the password are set in the group request and transmitted via the packet network 14.

In the spatial communication server 15, when the reception section 51 receives the group request, the password and the group number are handed over to the authentication section 52 and authentication is performed (step T21). A group response in which OK is set when authentication is successful or NG is set when authentication fails is sent to the spatial bulletin board display device 12 (step T22).

The spatial bulletin board display device 12 judges the content of the group response (step S24). When the group response is OK, it transmits a location request which requests the current positional information (longitude, latitude, altitude) of the spatial bulletin board display device 12 to the GPS equipment 13 (step S25).

Upon receiving the location request (step Q21), the GPS equipment 13 notifies the positional information (longitude, latitude, attitude) of the spatial bulletin board display device 12 which is requesting the location request (step Q22).

In the spatial bulletin board display device 12, the GPS receiver 47 receives the positional information (longitude, latitude, altitude) from the GPS equipment 13 and stores it in the memory 48 as the camera positional information (step S26). As a result, it is considered that the positional information of the camera 42 which is the position at which the user (B) who holds the spatial bulletin board display device 12 is standing at present has been stored in the memory 48 of the spatial bulletin board display device 12. The camera positional information acquired here is used to calculate the browsing center position when searching the spatial bulletin board later.

At the current position, the user (B) directs the camera 42 which is mounted in the spatial bulletin board display device 12 toward a desired direction and starts image pickup. The picked-up image taken in by the camera 42 is displayed on the liquid crystal display 26 in real time as an actual spatial image. At this time, probe light is irradiated from the distance measuring instrument 43 onto the center of an object (hereinafter, referred to as "object") of the camera 42. The distance measuring instrument 43 measures the distance to the object from the time required for the probe light to return from the object (step S27). The data of the measured distance to the object is recorded in the memory 48. For example, if the center of the object is the statue of Takamori Saigo, the distance from the camera position to the statue of Takamori Saigo is measured. On the other hand, when the center of the object is a faraway scene, the measurement becomes impossible because no probe light is reflected. The user (B) freely selects an object by changing the orientation of the camera 42 mounted in the spatial bulletin board display device 12.

The CPU40 calculates a browsing center position from the camera positional information, azimuth information by the electronic compass 45, data of the measured distance to the object and display mode (step S28). Since the first display mode displays the spatial bulletin board (object) which is registered within a radius of X meters centered on the object, the position of the object is calculated as the browsing center position. The azimuth of the object when the camera position is assumed to be a reference point is calculated from the azimuth information that electronic compass 45 detects. The position away from the camera position by a distance of X meters toward the object is calculated and the place is regarded as the browsing center position. Furthermore, in the second display mode, all spatial bulletin boards (objects) registered within the distance of X meters from the camera position are displayed, and therefore the distance to the object need not be measured. Therefore, when the second display mode is selected, the process of step S27 is skipped. The browsing center position (longitude, latitude, altitude) determined in this way is set in a data read request, which is then sent to the spatial communication server 15 (step S28).

The spatial communication server 15 receives the data read request at the reception section 51, extracts the browsing center position (longitude, latitude, altitude) from the data read request and hands it over to the search section 54. The search section 54 searches the spatial bulletin board (object) which is registered within a radius of X meters from the browsing center position from the SCDB 55 (step T23). In FIG. 7, suppose the positional information that falls within the radius of X meters from the browsing center position is denoted as 61*a*. The area of 61*a* includes a plurality of spatial bulletin boards (objects) which are public memos, a plurality of spatial bulletin boards (objects) which are group memos belonging to group 1 and one spatial bulletin board which is a group memo belonging to group 2. The search section 54 specifies the group from the group number secured at the time of the authentication and determines all spatial bulletin boards (objects) which belong to the group in question as the records to be read. Moreover, since the area of 61*a* includes public memos, the spatial bulletin boards (objects) of the public memos are also determined as the records to be read. When the search of the spatial bulletin board is completed, the record to be read is read from the SCDB 55 and transmitted to the requesting spatial bulletin board display device 12 via the packet network 14 (step T24). For example, in the case shown in FIG. 12, six objects OB1 to OB6 are registered as group memos or public memos of the group number 1 within X meters from the browsing center position in the positional information area of 61*a*. If the group number of the data read request is 1 and the first display mode is selected, the six objects OB1 to OB6 are extracted and delivered to the spatial bulletin board display device 12.

Figure 12:
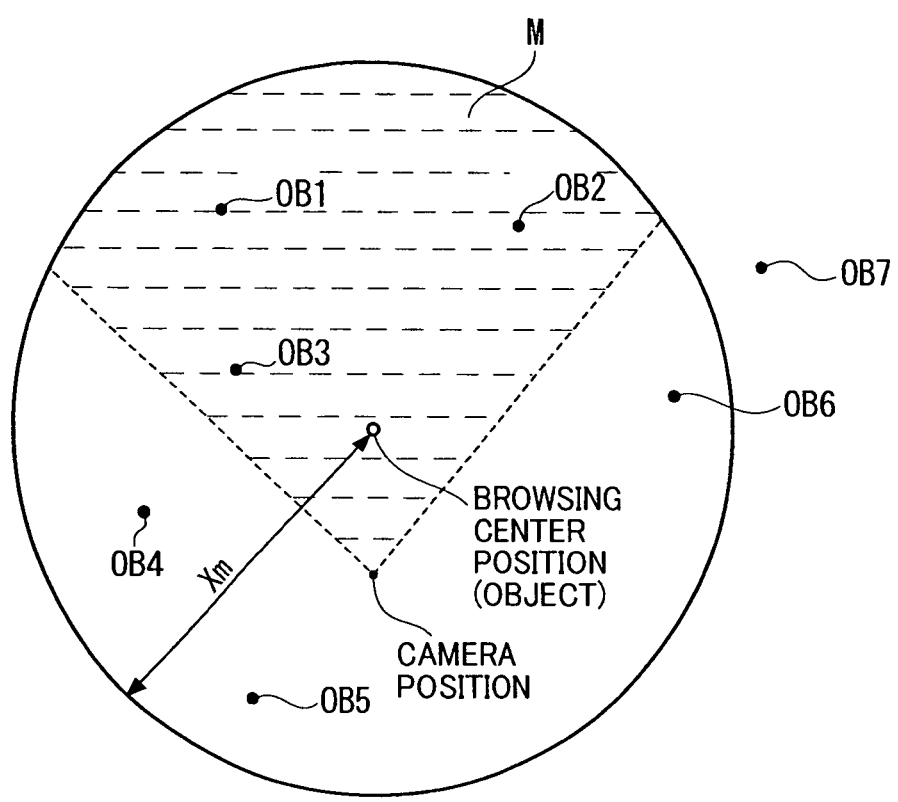
FIG. 12 illustrates a positional relationship between the browsing center position and an object.

The spatial bulletin board display device 12 stores the spatial bulletin board information which is sent from the spatial communication server 15 in the memory 48 for each object and the picked-up image in the actual space is displayed in real time on the liquid crystal display 26, and therefore the spatial bulletin board is displayed in accordance with the position in the actual space (step S29). For example, as shown in FIG. 12, when the six objects OB1 to OB6 are extracted and delivered to the spatial bulletin board display device 12, the three objects OB1, OB2, OB3 that fall within the current display range are displayed from among the six objects OB1 to OB6 in accordance with the positions in the actual space. First, all the delivered objects (OB1 to OB6) are stored in the memory 48, while the actual spatial image of a diagonally shaded area M is displayed on the liquid crystal display 26 in accordance with the viewing angle and orientation of the camera 42. The CPU 40 calculates the diagonally shaded area M from the viewing angle and orientation of the camera 42 and specifies the objects (OB1, OB2, OB3) which enter the diagonally shaded area M from the positional information of the respective objects (OB1 to OB6) as the object bulletin boards to be displayed. The display positions of the objects (OB1, OB2, OB3) in the diagonally shaded area M (actual space) are determined from the respective pieces of positional information of OB1, OB2, OB3 and spatial bulletin boards corresponding to OB1, OB2, OB3 are displayed at the determined display positions. FIG. 8 shows the three spatial bulletin boards M1, M2 and P1 displayed in the actual space displayed on the liquid crystal display 26 according to the above described processing. Though the objects are extracted and delivered by the spatial communication server 15, it is preferable to display the presence of the objects OB4, OB5, OB6 which are not displayed in the current image at a predetermined position of the liquid crystal display 26.

When the user (B) causes the browsing mode button to be displayed on the liquid crystal display 26 and depresses the OFF button, the browsing mode turns OFF and the browsing mode ends (step S30).

Figure 13:
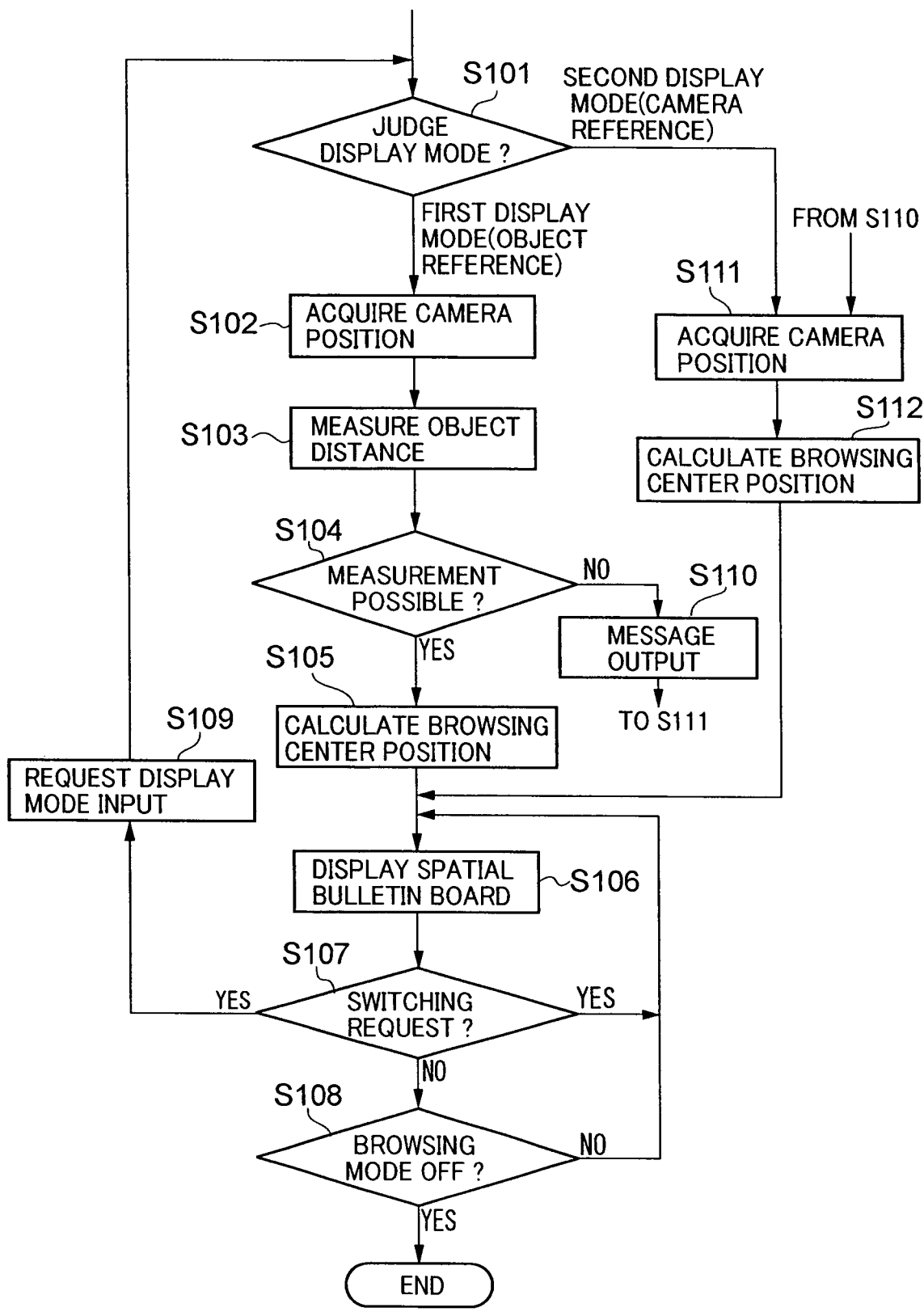
FIG. 13 is a flow chart showing partial operation contents of the spatial bulletin board display device.

FIG. 13 is a flow chart showing the processing contents of the spatial bulletin board display device 12 after receiving a group response (OK) until the browsing mode is turned OFF in the sequence of FIG. 11. When a group response (OK) is received, the spatial bulletin board display device 12 judges the display mode (step S101). For example, the first display mode is set as an initial setting so that the user can change the mode later.

When the first display mode is set, the camera position is measured in conjunction with the GPS equipment 13 (step S102) and moreover the distance measuring instrument 43 measures the distance to the object (step S103). When no object exists within the measurable range of the distance measuring instrument 43, measurement is judged to be impossible (step S104).

When the distance to the object can be measured, the browsing center position (object position) is calculated from the information such as the camera position, the distance to the object, the azimuth from the camera position toward the object (step S105). The coordinates of the browsing center position shown in FIG. 12 are determined.

All spatial bulletin board information which exists within the range of radius Xm centered on the browsing center position (object position) is sent from the spatial communication server 15 and stored in the memory 48. Since the diagonalty shaded area M out of the actual space around the camera 42 becomes the display range as shown in FIG. 12, the CPU 40 causes the spatial bulletin boards (objects OB1, OB2, OB3) included in the diagonally shaded area M to be displayed on the actual spatial image of the diagonally shaded area M (step S106).

Here, it is only at certain time points at which the diagonally shaded area M falls within the display range, and the position where the user (B) is located and the orientation of the camera 42 are always moving and the browsing center position also changes. When the browsing center position changes, there is a possibility that the spatial bulletin boards included in the changed display range may change. For example, when the orientation of the camera 42 is turned by a desired angle in FIG. 12, other spatial bulletin boards (e.g., objects OB5, OB7) are included in the actual display range.

Therefore, a switching button for changing the spatial bulletin boards to the latest ones may be displayed on the display 26 and when it is detected from the touch position of the touch panel 41 that the user has depressed the switching button (step S107), the browsing center position is recalculated and a request for re-reading the spatial bulletin board information is sent. In this case, a request for inputting the display mode is sent in order to arbitrarily set the display mode (step S109). A switching button composed of a hard switch may also be provided for the spatial bulletin board display device 12.

Furthermore, when the display mode in the processing in above step S101 is judged to be the second display mode, the camera position is acquired from the GPS equipment 13 (step S111) and the acquired camera position is regarded as the browsing center position (step S112).

Furthermore, when it is judged in above step S104 that the distance to the object is not measurable, a message indicating that the display mode will be changed to the second display mode is displayed (step S110) and the process is then moved to step S111. In the case where images of a scene where no object exists nearby or the like are taken, the mode is made to be automatically changed to the second display mode.

Furthermore, when the spatial bulletin boards are displayed superimposed on each other in the display of the spatial bulletin boards in step S106, it is preferable to use highlighting to indicate that other spatial bulletin boards exist on the back side. Display control is performed in such a way that another spatial bulletin board appears from the bottom when the user performs an operation to move the highlighted front spatial bulletin board. The initial display of a spatial bulletin board is performed at a position based on the positional information but the display position is changed according to the amount of operation without depending on the positional information through the subsequent bulletin board movement operation. The movement information on the spatial bulletin board is erased without being saved. On the other hand, the positional information of the spatial bulletin boards stored in the memory 48 in step S29 (FIG. 11) may also be saved as the default even after being moved so as to be used as the default when the browsing mode is turned OFF and turned ON again to browse the same place.

Furthermore, in the display of the spatial bulletin boards in step S106, a side view of a plane object may be shown depending on the positional relation between the camera position and the spatial bulletin boards. The object (plane object) displayed on the liquid crystal display 26 is preferably made rotatable through operation. Showing a front view of the plane object by rotating only the plane object using the rotation operation function makes the object easily viewable. Furthermore, an arbitrary object may also be made viewable in an enlarged size.

In this way, by displaying an object based on the spatial bulletin board information delivered from the spatial communication server 15 first and then allowing the user to operate the display condition of each object, it is possible to provide spatial bulletin boards easy to use and easy to see for the user.

The present invention is not limited to the above described embodiment but can be implemented modified in various ways.

Both the function of the spatial bulletin board input device 11 and the function of the spatial bulletin board display device 12 may also be incorporated into one portable information terminal.

Furthermore, the spatial bulletin board input device 11 may also be provided with a camera function and a large-sized display and contents such as text and images to be used as contents of spatial bulletin boards may be saved in the memory. After displaying the actual space on the display, the position on the display screen at which a content is pasted (top right, bottom left or the like) is specified and the user specified content is pasted at the specified position. The positional information (including azimuth information) of the spatial bulletin board input device 11 with content pasting positional information and content information added thereto is registered as spatial bulletin board information in the spatial communication server 15.

Furthermore, the following functions may also be added to the above described spatial bulletin board system.

A remote edit function is added to the spatial bulletin board system. The system is configured so as to allow a user having administrator authority to access the spatial communication server 15 from an administrator terminal via a network and write an object into a spatial bulletin board, paste text/image or the like or delete an object.

An object update data/update notification function is added to the spatial bulletin board system. A photograph having additional information such as GPS information taken by a spatial bulletin board compatible device is sent to the spatial communication server 15 so that only objects registered in the SCDB 55 are updated to latest information. When an object in the actual space is updated, the update is notified to each user of the corresponding group by e-mail from the spatial communication server 15.

An object notification function is added to the spatial bulletin board system. Specific bulletin board information is registered in the spatial communication server 15 beforehand, the positional information of the user terminal is checked with the spatial communication server 15 and when the user enters within a range of a predetermined distance from the specific spatial bulletin board, the user is notified of the presence of the object.

A similar bulletin board search function is added to the spatial bulletin board system. The user terminal is allowed to collect similar information while browsing a spatial bulletin board. Similar information linking between similar objects is set in the SCDB 55 beforehand and when a similar bulletin board search request is sent from the user terminal, similar objects linked to the object currently being searched are searched according to the similar information and delivered. In this case, in order to display the spatial bulletin board in correspondence with the actual space, it is preferable that the spatial bulletin board be made specifiable with a distance, for example, a diameter of 1 km.

An object timer function is added to the spatial bulletin board system. Information such as an object browsable time, object deletion time and browsing time is added to the spatial bulletin board information to be registered in the SCDB 55. The spatial communication server 15 controls the object browsable time, browsing time or the like according to the additional information in response to requests from the user terminal, while objects corresponding to the object deletion time are deleted from the SCDB 55.

An object function (link function) with additional information is added to the spatial bulletin board system. Link information for linking to the additional information of the object is registered in the SCDB 55. The system is configured in such a way that when an object is clicked at the user terminal, a link to the additional information is set up based on the link information.

An actual space navigation function is added to the spatial bulletin board system. A route is displayed in the actual space taken in from the camera by tracing the destination on a map beforehand. Route information is delivered according to the current position and direction based on the position/direction information sent from the user terminal. The route information may also be delivered area by area.

A browsing log aggregation/analysis function is added to the spatial bulletin board system. An object image-taking log is aggregated and an advertisement is displayed in part of the spatial bulletin board.

What is claimed is:

1. A system comprising:
a spatial bulletin board input device that converts a movement of drawing a memo content in an actual space to three-dimensional coordinate information, the spatial bulletin board takes in the information and acquires memo positional information which specifies a place where the memo is written;
a spatial communication server that receives and saves the three-dimensional coordinate information of the memo content and said memo positional information from said spatial bulletin board input device via a communication network; and
a spatial bulletin board display device comprising a processor, the spatial bulletin board display device is a hardware device that receives at an image-pickup place in an actual space the three-dimensional coordinate information of the memo content and the memo positional information near the image-pickup place from said spatial communication server and overlaps and displays the memo content on a picked-up image in the actual space based on the three-dimensional coordinate information and the memo positional information to display,
wherein said spatial bulletin board display device judges whether or not a distance to an object of image-pickup is measureable, and transmits an object position of the object to said spatial communication server as browsing positional information when the distance to the object is measureable, and if the distance to the object is not measurable the spatial bulletin board transmits the image-pickup place to said spatial communication server as browsing positional information, and
said spatial communication server searches for the three-dimensional coordinate information of the memo content whose memo positional information is included in a browsing range centered on the objector the image-pickup place, the search based on the browsing positional information transmitted from said spatial bulletin board display device, the spatial communication server delivers the searched three-dimensional coordinate information of the memo content to said spatial bulletin board display device together with the memo positional information and said spatial bulletin board display device displays an image based on said search,
further wherein the spatial bulletin board display device comprises a first display mode and a second display mode, the first display mode displays all spatial bulletin boards registered within a predetermined radius centered on the object and the second display mode displays all spatial bulletin boards registered within a predetermined distance from a camera position, wherein the first display mode is automatically shifted to the second display mode when the distance to the object is not measurable.

2. The system according to claim 1, wherein said spatial communication server saves a group number of a group in which the memo content can be browsed associated with the three-dimensional coordinate information of said memo content and delivers, when a browsing request which specifies the group number is received from said spatial bulletin board display device, the three-dimensional coordinate information and the memo positional information of the memo content which corresponds to said group number.

3. The system according to claim 1, wherein said spatial communication server comprises:
   a reception section that receives the three-dimensional coordinate information of the movement of drawing the memo content in the actual space sent from said spatial bulletin board input device via a communication network and memo positional information indicating the place in which the memo is written;
   a database that saves the three-dimensional coordinate information of the received memo content in correspondence with the memo positional information as a single piece of object data;
   a search section that searches the object data whose memo positional information is included within a browsing range from said database based on the browsing positional information sent by said spatial bulletin board display device in the image-pickup place in the actual space; and
   a delivery section that delivers the searched object data together with the memo positional information to said spatial bulletin board display device.

4. A spatial bulletin board display device, comprising:
   a hardware device comprising a processor;
   a camera that picks up an image of an actual space in an image-pickup place;
   a display that displays the picked-up image taken by said camera in real time;
   a position acquisition section that acquires a camera position which is the image-pickup place by communicating with position detection equipment;
   a communication section that communicates with a spatial communication server via a network, wherein browsing positional information indicating a predetermined position around the image-pickup place is sent to the spatial communication server, and based on said browsing positional information, the spatial communication server provides the communication section with three-dimensional coordinate information and memo positional information of a memo content, and the memo content is displayed at a predetermined position on the picked-up image, the display of the memo content based on the three-dimensional coordinate information and the memo positional information of the received memo content;
   an electronic compass that detects an azimuth;
   a distance measuring section that measures a distance to an object whose image has been picked up by said camera; and
   a first display mode and a second display mode, the first display mode displays all spatial bulletin boards registered within a predetermined radius centered on the object and the second display mode displays all spatial bulletin boards registered within a predetermined distance from the camera position, wherein when the first display mode is selected, an object position calculated from the measured value of the distance of the object, camera position and azimuth detection value is transmitted to said spatial communication server as browsing positional information and when the second display mode is selected, the camera position is transmitted to said spatial communication server as browsing positional information,
   wherein the first display mode is automatically shifted to the second display mode when the distance measuring section cannot measure the distance to the object.

5. A spatial communication server comprising:
   a hardware device comprising a processor;
   a reception section that receives three-dimensional coordinate information of a movement of drawing a memo content in an actual space and memo positional information indicating a place in which the memo is written, the three-dimensional coordinate information and memo positional information are sent from a spatial bulletin board input device via a communication network;
   a database that saves the received three-dimensional coordinate information in correspondence with the memo positional information as a single piece of object data;
   a search section that searches the object data whose memo positional information is included in a browsing range centered on an object from said database, the search based on browsing positional information, the browsing positional information is an object position of the object when a spatial bulletin board display device can measure a distance to the object of image-pickup and the browsing positional information is the image pick-up place when the spatial bulletin board display device cannot measure the distance to the object of image-pickup; and
   a delivery section that delivers the searched object data together with the memo positional information to said spatial bulletin board display device, wherein the spatial bulletin board display device displays an image based on said search.

6. A communication method using a spatial bulletin board comprising:
   converting a movement of drawing a memo content in an actual space to three-dimensional coordinate information by a spatial bulletin board input device;
   acquiring memo positional information which specifies a place where the memo is written;
   saving the three-dimensional coordinate information and the memo positional information to a spatial communication server via a communication network;
   judging, in a spatial bulletin board display device, whether or not a distance to an object of image-pickup is measureable, if the distance to the object is measurable then an object position of the object is transmitted to the spatial communication server as browsing positional information in the spatial bulletin board display device and if the distance to the object is not measurable then the image-pickup place is transmitted to the spatial communication server as browsing positional information in the spatial bulletin board display device;
   searching for the three-dimensional coordinate information of the memo content whose memo positional information is included in a browsing range centered on the object or the image-pickup place, the search based on the browsing positional information transmitted from said spatial bulletin board display device;
   delivering the searched three-dimensional coordinate information of the memo content to said spatial bulletin board display device together with the memo positional information in said spatial communication server;

displaying a picked-up image of an actual space in the image-pickup place of the actual space on the spatial bulletin board display device, the spatial bulletin board display device having a first display mode and a second display mode, the first display mode displays all spatial bulletin boards registered within a predetermined radius centered on the object and the second display mode displays all spatial bulletin boards registered within a predetermined distance from a camera position, wherein the first display mode is automatically shifted to the second display mode when the distance to the object is not measurable; and acquiring the three-dimensional coordinate information of the memo content and the memo positional information near the image-pickup place from the spatial communication server and displaying the memo content on the picked-up image in the spatial bulletin board display device.

* * * * *